(12) United States Patent
Martynenko et al.

(10) Patent No.: US 11,104,694 B2
(45) Date of Patent: Aug. 31, 2021

(54) METHOD OF PRODUCING A METHYLSILICIC ACID HYDROGEL WITH PROPERTIES OF SUPRAMOLECULAR STRUCTURES, AND A HYDROGEL PRODUCED USING THE METHOD

(71) Applicant: Bioline Products s.r.o., Krakovská (CZ)

(72) Inventors: Oleksandr Mykhailovych Martynenko, Kharkov (UA); Oleksandr Viktorovich Chyhyryk, Bucha (UA)

(73) Assignee: BIOLINE PRODUCTS S.R.O., Krakovská (CZ)

( * ) Notice: Subject to any disclaimer, the term of this patent is extended or adjusted under 35 U.S.C. 154(b) by 0 days.

(21) Appl. No.: 16/642,963

(22) PCT Filed: Jul. 9, 2018

(86) PCT No.: PCT/UA2018/000069
§ 371 (c)(1),
(2) Date: Feb. 28, 2020

(87) PCT Pub. No.: WO2019/045667
PCT Pub. Date: Mar. 7, 2019

(65) Prior Publication Data
US 2020/0308199 A1 Oct. 1, 2020

(30) Foreign Application Priority Data

Aug. 30, 2017 (UA) ................ a 2017 08754

(51) Int. Cl.
| | | |
|---|---|---|
| *C08G 77/02* | (2006.01) |
| *C07F 7/18* | (2006.01) |
| *C08G 77/08* | (2006.01) |
| *C08G 77/16* | (2006.01) |

(52) U.S. Cl.
CPC ............. *C07F 7/188* (2013.01); *C08G 77/02* (2013.01); *C08G 77/08* (2013.01); *C08G 77/16* (2013.01); *C08G 2210/00* (2013.01)

(58) Field of Classification Search
CPC ........................... C07F 7/188; C08G 2210/00
See application file for complete search history.

(56) References Cited

U.S. PATENT DOCUMENTS

| | | | | |
|---|---|---|---|---|
| 3,335,017 A * | 8/1967 | Spencer | ................ | D21H 19/12 |
| | | | | 428/447 |
| 4,252,569 A * | 2/1981 | Roedel | ................ | C08G 77/398 |
| | | | | 106/287.16 |
| 8,153,749 B2 * | 4/2012 | Kadnichansky | ....... | B01J 20/262 |
| | | | | 528/33 |
| 9,868,843 B2 * | 1/2018 | Evans | ..................... | C08K 3/04 |
| 2010/0240532 A1 * | 9/2010 | Tolcheyev | ......... | B01J 20/28069 |
| | | | | 502/401 |
| 2011/0003960 A1 * | 1/2011 | Kadnichansky | ....... | B01J 20/262 |
| | | | | 528/33 |

FOREIGN PATENT DOCUMENTS

| | | | | |
|---|---|---|---|---|
| EA | 012985 | 2/2010 | | |
| EP | 2116564 A1 * | 11/2009 | ............. | C08G 77/16 |
| EP | 2514717 A1 * | 10/2012 | ........... | C01B 33/155 |
| RU | 2111979 | 5/1998 | | |
| RU | 2111979 C1 * | 5/1998 | | |
| WO | WO-2016054524 A2 * | 4/2016 | .......... | B01J 13/0091 |
| WO | WO-2016071405 A2 * | 5/2016 | .............. | A61P 17/02 |

* cited by examiner

Primary Examiner — Alexander R Pagano
(74) Attorney, Agent, or Firm — Finnegan, Henderson, Farabow, Garrett & Dunner LLP (57) ABSTRACT

A methylsilicic acid hydrogel is produced by reacting a solution of sodium methyl siliconate with a gaseous acid agent. The resulting product is vacuumised to remove residual gas, and washed with water. A significant OH-group content in the hydrogel, which results from bubbling the gaseous acid agent through the solution of sodium methyl siliconate, makes it possible to increase the selectivity of the adsorption properties when the hydrogel is used in medicine and veterinary science.

10 Claims, 1 Drawing Sheet

FIG. 1

FIG. 2

METHOD OF PRODUCING A METHYLSILICIC ACID HYDROGEL WITH PROPERTIES OF SUPRAMOLECULAR STRUCTURES, AND A HYDROGEL PRODUCED USING THE METHOD

This application is a National Stage Entry of International Application No. PCT/UA2018/000069, filed on Jul. 9, 2018, which claims the priority of Ukrainian Patent Application No. a 201708754, filed on Aug. 30, 2017. The contents of each of these applications are incorporated by reference in their entirety.

The present invention relates to chemistry, particularly to synthesis of chemical compounds—polymethylsiloxanes (methylsilicic acid hydrogels), and can be used in medicine and veterinary science as a sorbent that has selective properties.

There have been known polymethylsesquioxanes of the general chemical formula:

$$[CH_3SiO_{1.5}]$$

describing a number of substances, including methylsilicic acid hydrogel, which is represented by the general formula:

$$(CH_3SiO_{1.5} \cdot nH_2O)_\infty, \text{ where } n=30\text{-}46.$$

These compounds are cross-linked polymers of complex topology surrounded by a hydration shell. The main method of their producing is to carry out polycondensation from an alkaline phase.

Based on the structural representation of these polymers, it should be understood that they contain residual non-condensed hydroxyl groups (OH groups) and the generalizing gross formula of the polymer in linear form (without considering the hydration shell) is:

$$(CH_3Si)_n O_{(n-1)} OH_{(n+2)}$$

As the polycondensation proceeds, the polymer is branched to form an intermediate structure of the form:

$$(CH_3Si)_n O_{(n-1+k)} OH_{(n+2-2k)} \quad (1)$$

where $0 \leq k \leq \frac{1}{2} \cdot (n+3/2+\frac{1}{2} \cdot (-1)^n)$.

It is obvious that:

when k=0, the polymer is a form with a predominantly linear topology. The existence of the polymer in this form is more inherent in alkaline solutions;

when $k=\frac{1}{2} \cdot (n+3/2+\frac{1}{2} \cdot (-1)^n)$, the polymer is a form with a cyclic topology, fully condensed, without OH groups. This polymer form is inherent in methylsilicic acid xerogels;

when $0<k<\frac{1}{2} \cdot (n+3/2+\frac{1}{2} \cdot (-1)^n)$, the polymer is a form with a topology intermediate between linear and cyclic topologies. In fact, this form is inherent in a group of compounds generally referred to as methylsilicic acid hydrogels.

Polycondensation of OH groups of the limit linear structure (k=0) is described by the chemical equation:

$$(CH_3Si)_n O_{(n-1)} OH_{(n+2)} \rightarrow (CH_3Si)_n O_{(n-1+k)} OH_{(n+2-2k)} + kH_2O$$

The above reaction is an intramolecular polycondensation process and is accompanied by cyclization of the molecule.

The polymer chain growth in the example of polycondensation interaction of two molecules with structures of intermediate topologies (m≠n and $0<k<\frac{1}{2} \cdot (n+3/2+\frac{1}{2} \cdot (-1)^n)$; $0<q<\frac{1}{2} \cdot (m+3/2+\frac{1}{2} \cdot (-1)^m)$) is expressed as a chemical equation:

$$(CH_3Si)_n O_{(n-1+k)} OH_{(n+2-2k)} + (CH_3Si)_m O_{(m-1+q)} OH_{(m+2-2q)} \rightarrow (CH_3Si)_{(n+m)} O_{(m+n-2+k+q+p)} OH_{(n+m+4-2k-2q-2p)} + pH_2O$$

where $$1 \leq p \leq \frac{1}{2} \cdot (m+2-2q).$$

There has been known a method of producing a methylsilicic acid hydrogel, comprising the following steps: preparing a working mixture of methyltriethoxysilane and an organic solvent, preparing a hydrolyzed mixture of hydrochloric acid and purified water, preparing an alkaline solution, hydrolyzing methyltriethoxysilane in the presence of an acidic catalyst with subsequent alkaline treatment, lefting the reaction mass to stand, comminuting the resultant methylsilicic acid alcogel, and then washing it with purified water to give a methylsilicic acid hydrogel. When preparing the working mixture, an aqueous solution of ethanol with ethyl alcohol in a proportion by volume of from 60 to 96.5% is used as an organic solvent, and the volume ratio of methyltriethoxysilane to the organic solvent in the form of an aqueous ethanol solution is (1-1.2):(2-2.7), respectively, the methyltriethoxysilane is used in a proportion by mass of the basic substance of at least 98%, and methyltriethoxysilane is hydrolyzed in a volume ratio of the working mixture to hydrolyzing mixture of (3-3.5):(0.7-1.5), respectively, the time for introducing the hydrolyzing mixture into the reaction mass is 30-40 min., and the resultant reaction mass is left to stand for 3-3.5 hours at a pH of at least 3, and after completion of the methyltriethoxysilane hydrolysis, an alkaline solution is introduced into the resultant reaction mass at a temperature of 16-30° C., and then the resultant methylsilicic acid alcohydrogel is left to stand to mature for at least 7.5 h., the maturing process of methylsilicic acid alcohydrogel is performed until a colorless intermediate with slight opalescence is produced, and the comminuted methylsilicic acid alcohydrogel is washed by adding purified water at a rate of 2-4 l per hour [UA 90988, C08G 77/00, 2010].

The method has the following disadvantages.

For complete cleavage of the ethoxy groups, the necessary condition is the presence of a strong alkaline medium (for the complete course of the saponification reaction the concentration of the alkali should be at least 5 mol/l) and the increased temperature of the reaction mixture (at least 60° C.). The use of acids in the polycondensation stage for alcoholic solutions results in the formation of a by-product—diethyl ether. Since the product has adsorption properties, it adsorbs both the reaction products and the ethyl alcohol from the solvent medium. The resultant product produced by this method contains related substances: ethyl alcohol, diethyl ether and unsaponified ethoxysilane. Removal of these substances from the product requires large amounts of purified water and cannot be carried out completely in accordance with the conditions specified in the production method.

Known in the art is a method for producing a sorbent based on a methylsilicic acid hydrogel of the general formula $\{(CH_3SiO_{1.5}) \cdot mH_2O\}n$, where m is the number of water molecules in the link $\{(CH_3SiO_{1.5}) \cdot mH_2O\}$, n is the number of links in the hydrogel, according to which the hydrogel is produced from the basic substance in the presence of a strong acid in an alcohol medium by hydrolysis with subsequent polycondensation in an alkaline medium, which is held and comminuted, and the resulting product is washed to neutral reaction, the strong acid is used in a concentration of 0.5% to 1.2%, and the alkaline reagent for the polycondensation reaction is used in a concentration of 20% to 27% [UA 72402, C08G 77/04, 2012].

Like the preceding case, the use of acids in the polycondensation stage for alcoholic solutions results in the formation of a by-product-diethyl ether. Since the product has adsorption properties, it adsorbs both the reaction products and the ethyl alcohol from the solvent medium. The resulting product produced by this method comprises the following related substances: ethyl alcohol and diethyl ether. The removal of these substances from the product also requires large amounts of purified water and cannot be carried out completely in accordance with the conditions specified in the production method.

Known in the art is a method of producing a methylsilicic acid hydrogel, in which a polycondensation process of a solution of sodium (or potassium) methyl siliconate of concentration of 1.75 to 2.30 mol/l is carried out by adding a solution of a strong acid to form a hydrogel, which after holding for 30-90 min (aging) is comminuted and then activated by adding a dilute solution of a strong acid of concentration of 0.04 to 0.15 g*eq/l, with subsequent washing out with water until neutral reaction [RU 94008432 A1, C08G 77/02, 1995].

The formed gel is treated with dilute solutions of strong acids (activation stage), resulting in final condensation of the hydroxyl groups and, thus leading to loss of properties of supramolecular structures and loss of conformational mobility.

The closest prior art method is a method for producing a sorbent based on a methylsilicic acid hydrogel of the general formula: $\{(CH_3SiO_{1.5}).nH_2O\}\infty$, comprising the following steps: adding a solution of a strong acid to a solution of sodium methyl siliconate or potassium methyl siliconate until a product is formed, then holding, comminuting, activating the product by adding a diluted solution of a strong acid and washing the product to a neutral reaction, the solution of sodium methyl siliconate or potassium methyl siliconate is at a concentration of 2.35-2.95 mol/l and, by varying the multiplier n to be up at n=495, the sorbent is obtained in various resultant forms and exhibiting selective sorptive properties with respect to high-molecular substances with a molecular weight of 10.000-500.000 Dalton and more [UA 82774, C08G 77/00, 2008].

The above method has the following disadvantages.

Since one of the components of the mixture is a strong acid, and the other is an alkaline solution of sodium methyl siliconate, a salt of a strong alkali and a strong acid is formed, which does not have a protective effect on OH groups (solutions of such salts have an acidity close to neutral). In this case, transformations in the system entirely depend on the ratio of the alkaline component, which decreases with the synthesis and the strongly acid component.

Under these conditions, the reaction cannot be controlled and results in a product which is non-uniform in physical and chemical characteristics, which makes it difficult to standardize.

The use of dilute solutions of strong acids in the production steps results in the formation of low molecular weight fractions of the product which contribute to the reduction of the adsorption capacity that is positioned as the main characteristic for it. According to the requirements of the relevant practice of pharmaceutical production, the formation of low molecular weight fractions should be considered as related substances from the point of integrity of the composition of the active pharmaceutical ingredient, which is a methylsilicic acid hydrogel.

Industrial production produces waste water that contains dissolved and suspended matter at levels of many times exceeding the maximum permissible concentrations, which requires creation of separate treatment complexes and creates problems for further disposal.

There has been known a methylsilicic acid hydrogel with high sorptive capacity and selectivity with respect to medium molecular toxic metabolites (enterosgel-super) of the formula:

where n=44-49 characterized by sorptive capacity for Kongo red of 3.3-4.6 mg/g [RU 94008432 A1, C08G 77/02, 1995].

Such hydrogel has purely sorptive properties with low selectivity.

The closest prior art hydrogel is a methylsilicic acid hydrogel as a sorbent of medium molecular metabolites of the formula:

$\{(CH_3SiO_{1.5}).nH_2O\}\infty$, where n=44-49 characterized by sorptive capacity for Kongo red of 3.3-4.6 mg/g [RU 2 111 979 C1, C08G 77/02, 1998].

Like the previously mentioned art, this hydrogel has purely sorptive properties with low selectivity, and is non-uniform in physical and chemical characteristics, which complicates its standardization. In addition, the use of dilute solutions of strong acids results in the formation of low molecular weight fractions of the product (related substances), which contribute to the reduction of the adsorption capacity, which is positioned as the main characteristic for it.

It is an object of the invention to provide a method of producing a methylsilicic acid hydrogel with properties of supramolecular structures, which is highly technological, cost-effective and environmentally friendly.

The second object of the invention is to provide a hydrogel which should have developed selective adsorption properties and, in addition, properties of supramolecular structures, to use it in medicine and veterinary science as an individual substance with therapeutic properties, and as a matrix for complex compositions with functions of controlled and/or prolonged release and/or targeted delivery of substance.

For the accomplishment of the foregoing object, in the provided method of producing a methylsilicic acid hydrogel with properties of supramolecular structures, the method using a solution of sodium methyl siliconate, according to the invention, a gaseous acid agent is passed through the solution of sodium methyl siliconate fed into a reactor for bubbling, the resulting product is floated in a neck of the reactor, after the end of the process the product is discharged from the reactor, vacuumised to remove residual gas, and washed with water purified to pH 6.5-7.0 without residual amounts of anions, producing the methylsilicic acid hydrogel with properties of supramolecular structures, which is described by the formula:

$[\{CH_3Si(OH)_2O_{0.5}\}_{a/n}\{CH_3Si(OH)O\}_{b/n}\{CH_3SiO_{1.5}\}_{c/n}].xH_2O$, where The bubbling time is 45 minutes, and the bubbling rate is 333 ml of gaseous agent per minute.

A gaseous acid agent is carbon dioxide, which is fed through the bottom valve of the reactor by operating in a closed system.

A gaseous acid agent is carbon dioxide, which is fed through the top valve of the reactor by operating in an open system.

A gaseous acid agent is sulfur (IV) oxide—$SO_2$.
A gaseous acid agent is hydrogen sulfide—$H_2S$.
A gaseous acid agent is sulfur (VI) oxide—$SO_3$.
A gaseous acid agent is hydrogen chloride—HCl.

The solution of sodium methyl siliconate can be fed dropwise through a comb over the hydrophobic surface of the trough placed in the gaseous acid agent medium for 20 minutes.

The second object of the invention is accomplished by producing, according to the method of claim 1, a methylsilicic acid hydrogel with properties of supramolecular structures, which is described by the formula:

$$[\{CH_3Si(OH)_2O_{0.5}\}_{a/n}\{CH_3Si(OH)O\}_{b/n}\{CH_3SiO_{1.5}\}_{c/n}] \cdot xH_2O, \text{ where}$$

$$11 \leq x \leq 35; 0 \leq \frac{a}{n} \leq 0.38; 0.19 \leq \frac{b}{n} \leq 0.9; 0.11 \leq \frac{c}{n} \leq 0.49.$$

Compared with the closest prior art, the inventive method is controllable, highly technological, environmentally friendly and cost-effective.

The produced methylsilicic acid hydrogel has developed selective adsorption properties and, in addition, properties of supramolecular structures, which makes it possible to use it in medicine and veterinary science as an individual substance with therapeutic properties, and as a matrix for complex compositions with functions of controlled and/or prolonged release and/or targeted delivery of substance.

The solution of salt formed by interaction of a weak acid and a strong base performs the protective function of non-condensed hydroxyl groups, since the acidity of solutions of such salts is alkaline. The polymer is characterized as a preorganized conformationally mobile polymer.

The reaction proceeds in a three-phase system: initial liquid, temporary gas and solid, which is formed. The branching of the polymer in the gas phase is not hindered by counteracting the viscosity of the liquid medium. The resulting polymer is obtained with a smaller mesh size, which determines the intensity of the selective properties.

The formed gel is not treated with acid solutions, which does not cause the final condensation of the hydroxyl groups and makes it possible to form properties of supramolecular structures, and provides the conformational mobility. The resulting product has sorptive properties with increased selectivity and has the properties of supramolecular structures.

In an industrial implementation of the inventive method, salt solutions (e.g. sodium carbonate) formed in waste water do not require creation of additional complex for disposal of waste and their further use or disposal, which makes the process economically advantageous and environmentally friendly.

The study of the characteristics of the formation of cross-linked polymers of the siloxane group has led to the creation of the chemical formula that simultaneously describes the topological component of the substances along with the chemical composition.

The formation of the net structure in the example of polymethylsiloxanes is due to the presence of three basic fragments in the polymer (Table 1):

TABLE 1

| Fragment | Structure | Gross formula, name | Description |
|---|---|---|---|
| M (mono-) | HO—Si(CH$_3$)(OH)—O— | $\{CH_3Si(OH)_2O_{0.5}\}$ (methyldihydroxosilhemioxyl) | End fragments of a molecule with one active polymerization center that break the polymer chain growth. |
| D (di-) | —O—Si(CH$_3$)(OH)—O— | $\{CH_3Si(OH)O\}$ (methylhydroxosiloxyl) | Fragments with two active polymerization centers. Form the elastic component of the polymer skeleton. Contribute to the internal cyclization of the molecule. |
| T (tri-) | —O—Si(CH$_3$)(O—)—O— | $\{CH_3SiO_{1.5}\}$ (methylsilsesquioxyl) | Fragments with three active polymerization centers. Contribute to the trimerization and cyclization of the molecule. |

The summary of the above is the inventive chemical formula:

$$\{CH_3Si(OH)_2O_{0.5}\}_a\{CH_3Si(OH)O\}_b\{CH_3SiO_{1.5}\}_c \quad (2)$$

This formula already describes the topology of the polymer molecule in terms of quantitative measures of the coefficients a, b, c.

The relationship of Formulas (1) and (2):

$$n = a + b + c$$

$$k = 0.5(c - a) + 1$$

Formula (2) can be also written as gross form of Formula (1):

$$(CH_3Si)_{(a+b+c)}O_{(0.5a+b+1.5c)}OH_{(2a+b)}$$

Chemical Formula (2) describes all possible structures of polymethylsiloxanes. It should be noted that from the point of features of formation and properties of the siloxane bond [Siloxane Bond. Voronkov M. G., Mileshkevich V. P., Yuzhelevsky Yu. A. Novosibirsk, "Nauka", 1976, 413 p.] the following structures and fragments are inadmissible:

Due to the complexity of experimental determination of the molecular weights of cross-linked polymers, it was suggested to use Chemical Formula (2) in the following form, namely:

$$\{CH_3Si(OH)_2O_{0.5}\}_{a/n}\{CH_3Si(OH)O\}_{b/n}\{CH_3SiO_{1.5}\}_{c/n} \quad (3)$$

Chemical Formula (3) is a generalization of Formulas (1) and (2).

This formula is conveniently written using the fragments codes given in Table 1. The compound can then be represented by the following formula:

$$M_a D_b T_c \quad (4)$$

or in the form given above:

$$M_{a/n} D_{b/n} T_{c/m} \quad (5)$$

Table 2 shows the basic transformations of molecules of Formula (4) in the polycondensation process by the example of molecules with the formulas $M_a D_b T_c$ and $M_x D_y T_x$.

TABLE 2

Basic transformations of molecules in the polycondensation process

| Type of polycondensation | Type Description | Reaction |
|---|---|---|
| Intermolecular M-M | Interact mono-linked fragments containing two OH groups | $M_a D_b T_c + M_x D_y T_z \rightarrow M_{(a+x+2)} D_{(b+y+2)} T_{(c+z)} + H_2O$ |
| Intramolecular M-M | | $M_a D_b T_c \rightarrow M_{(a-2)} D_{(b+2)} T_{(c)} + H_2O$ |
| Intermolecular M-D | Interact mono-linked fragments containing two OH groups and one OH group, respectively | $M_a D_b T_c + M_x D_y T_z \rightarrow M_{(a+x-1)} D_{(b+y)} T_{(x+z+1)} + H_2O$ |
| Intramolecular M-D | | $M_a D_b T_c \rightarrow M_{(a-1)} D_{(b+3)} T_{(c+1)} + H_2O$ |
| Intermolecular D-D | Interact bi-linked fragments, one OH group | $M_a D_b T_c + M_x D_y T_z \rightarrow M_{(a+x)} D_{(b+y-2)} T_{(c+z+2)} + H_2O$ |
| Intramolecular D-D | | $M_a D_b T_c \rightarrow M_{(a)} D_{(b-2)} T_{(c+2)} + H_2O$ |

The inventive formula describing structures of cross-linked polymers, polyorganosiloxanes, of the previously known form [$RSiO_{1.5}$] has the form:

$$\{R_1Si(OR_2)_2O_{0.5}\}_a\{R_1Si(OR_2)O\}_b\{R_1SiO_{1.5}\}_c,$$

where $R_1$=$CH_3$, $C_2H_5$, $CH_2$=$CH$ etc.; $R_2$=H, $CH_3$, $C_2H_5$ and other.

Modelling of molecules and calculation of molecular parameters with a chain size of up to 50 links in various conformations was carried out in the medium of HyperChem 8.09 software package using the semi-empirical quantum-chemical method AMI (extended Hückel method), using the theory of interaction of a system of charged particles. The further optimization of this system was carried out by minimizing the energy and its gradient (rate of change of energy) using the Polack-Ribier algorithm.

Intermolecular and intramolecular interactions were modelled using examples of systems containing a hydrate environment and/or starting reagents (time point "zero" to enter into interaction), and/or intermediate reaction products and/or polycondensation reaction products.

Estimation of geometric parameters of target molecules and modelling of the polycondensation process on the basis of developed theories of the probability characteristics of the interactions of Flory, Frisch, and Stepto [P. Flory, Principles of Polymer Chemistry, Cornell University Press, Ithaca, N.Y., 1953] was carried out by creating macros in Microsoft Excel and then visualizing the topology of the obtained systems based on the randomization of transformations according to Table 2.

The geometric characteristics of the molecules were processed by comparing the differences in the normalized coordinates of silicon atoms in model molecules in the presence of the hydrated environment and without it. Visualization of the obtained data was carried out by finding a point equidistant from geometric coordinates of atoms of the model of the molecule. Subsequently, based on a set of distances from the equidistant point to the atoms of the molecule, the topology of the molecule in polar coordinates was built.

Figure 1:
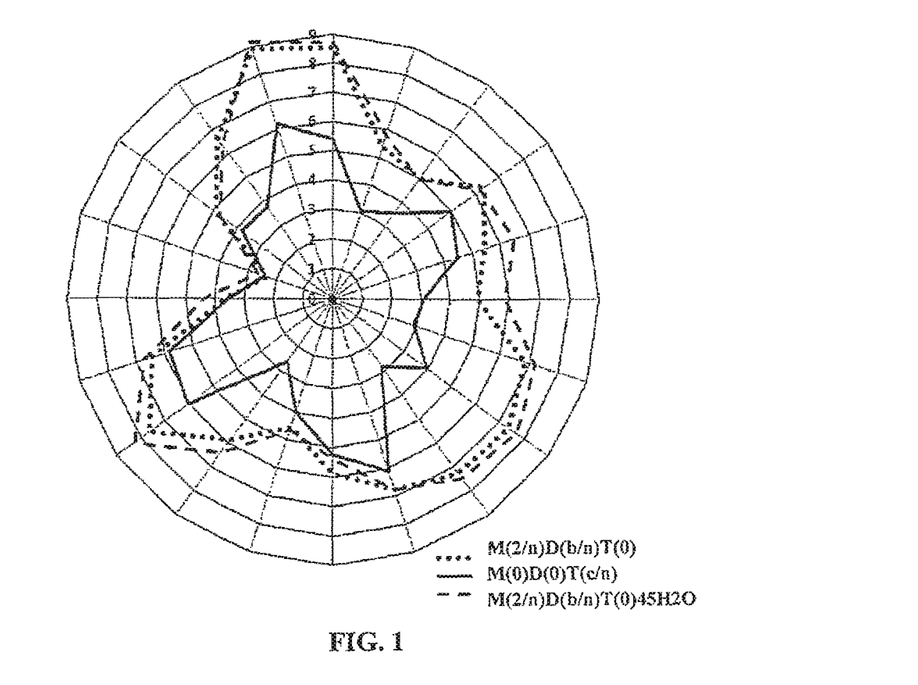

FIG. 1 shows an example of a topogram of molecules with equal number of links: fully cyclic ($M_0 D_0 T_{c/n}$), original linear form ($M_{2/n} D_{b/n} T_0$) and linear form with a hydration shell ($M_{2/n} D_{b/n} T_0 \cdot 45H_2O$).

As can be seen from FIG. 1, the presence of OH groups significantly affects the conformation of the molecule, and the presence of a hydration shell does not significantly affect the change in the conformation of the molecule.

The general conclusion of the presented data is the fact that the OH groups of the molecule define the conformational mobility of the molecule, and the change in certain conditions provoking both intramolecular and intermolecular polycondensation of OH groups results in demonstration or absence of supramolecular properties of the substance as a whole.

The behaviour of the model molecule with a hydrate environment, with a different number of water molecules in the cavities and outside the cavities of the structures, led to the positioning of the behaviour of the substance (methylsilicic acid hydrogel) as supermolecular or supramolecular structures of a host-type relative to substances present in the space between the molecules of a guest-type. Additionally, systems containing various guests in chemical nature were modelled.

The models and the theory were confirmed using the developed research methods and hardware methods of thermogravimetry, cryoscopy, amperometric titration, titration of water according to the method of K. Fisher, IR, and UV-VIS spectroscopy.

The studies were carried out both on samples of methylsilicic acid hydrogel produced by the closest prior art method and on samples of substances obtained by the inventive method.

The study of properties of the substances produced by the inventive method resulted in discovery of unexpected previously unknown effects, and confirmed the above hypothesis. This makes it possible to position the obtained substances in addition to substances with adsorption properties as substances with a supramolecular structure, possessing host-guest-type properties as a preorganized conformationally mobile host [Supramolecular Chemistry. Translated from English: in 2 vol./Jonathan W. Steed, Jerry L. Atwood.—M.; IKC "Akademkniga", 2007].

The condition for the preorganization of the structure of the substance obtained by the inventive method is the rigidity of its backbone. In such a case, the substance is positioned as a host, tuned to a specific guest and determines the selectivity of the host.

The backbone rigidity is provided by the presence of maximum number of T-fragments in the molecule, based on the data presented in Table 1, Formulas (4) and (5).

On the other hand, the conformation mobility of the molecule is provided by the maximum content of OH groups. Elasticity and mobility of the molecule are provided by D-fragments.

To meet the condition of a conformationally mobile preorganized structure, it is necessary that values of the substance coefficients b/n and c/n in Formulas (3) and (5) are maximal.

Theoretically, the presented conditions are met by substances of Chemical Formulas (3) and (5) with coefficients values corresponding to the condition:

$$0.10 \leq \frac{b \cdot c}{n^2} \leq 0.30.$$

In such a case, the variation ranges of the coefficients of Chemical Formula (5) will be:

$$0 \leq \frac{a}{n} \leq 0.38; \; 0.16 \leq \frac{b}{n} \leq 0.90; \; 0.11 \leq \frac{c}{n} \leq 0.60.$$

The calculated content of OH groups of the compound will be from 16% to 24%.

In practice, it is possible to obtain conditions of the backbone rigidity (preorganization) conditions and its maximum conformational mobility due to protection of OH groups of the formed polymer, and/or due to application of phase transition in the medium of molecular formation.

In the closest prior art, a stage of chain break is used in the synthesis by the influence of weak solutions of strong acids, which does not lead to protection of OH groups, but rather provokes formed polymer, and/or due to application of phase transition in the medium of molecular formation.

In the closest prior art, a stage of chain break is used in the synthesis by the influence of weak solutions of strong acids, which does not lead to protection of OH groups, but rather provokes their polycondensation to the equilibrium stage. As a result, this leads to the formation of a rigid preorganized structure which does not have host-guest type properties, but has selectivity only due to adsorption capacity of the created pores.

Study of stock solutions of sodium methylsiliconate for the determination of molecular masses of dissolved polymers by cryoscopy of stock and diluted solutions led to the conclusion that there was a set of fragments from 4 to 8 of measured units in the solution. The modelling of molecular mechanics confirms their overwhelming linear structure. Another reason for the linearity of the molecules is the fact that the polymer solution is in a strongly alkaline medium and is saturated with OH groups of an alkali solvent.

Based on the studies, the gel-formation time of hydrogels obtained by the closest prior art method using a solution of a strong acid of various volumes, by pouring to a fixed volume of sodium methylsiliconate, has an exponential dependence on the molar ratio of components. This is indicative of the progress of the gelation reaction according to the radical chain type, since gelation also occurs in the presence of small amounts of a strong acid. The gelation steps have been proposed to be described as follows.

1. Neutralization of alkali to equilibrium concentration;
2. Growing polymer length by intermolecular interaction (intermolecular polycondensation) of polymers under the influence of $H^+$ ions;
3. Cyclization and trimerization of the polymer (conformational before skeleton organization);
4. Chain break;
5. If sufficient amount of $H^+$ ions are present, internal molecular polycondensation (loss of conformational mobility of the molecule due to an increase in the rigidity of the skeleton). Onset of microsyneresis.

To maintain optimal conformational mobility of the molecule, it is necessary to introduce the step of protection of OH groups of the molecule.

Due to the fact that in the production method described in the closest prior art, one of the components of the mixture is a strong acid, and the other is an alkaline solution of sodium methyl siliconate, a salt of a strong alkali and a strong acid is formed, which does not have a protective effect on OH groups (solutions of such salts have an acidity close to neutral). In this case, transformations in the system entirely depend on the ratio of the alkaline component, which decreases with the synthesis and the strongly acidic component.

This disadvantage can be avoided in the claimed method.

It is known that solution of sodium methyl siliconate contains an alkali metal cation; therefore, to obtain a weak salt, which could contribute to the protective effect on the OH groups of the molecule, it is necessary to use either acids with weak anions, or gaseous acid anhydrides.

Among a large number of substances that meet the conditions described above, the authors focused on the use of gaseous acid agents, such as:

carbon dioxide—$CO_2$;
sulfur oxide (IV)—$SO_2$;
sulfur oxide (VI)—$SO_3$;
hydrogen sulfide—$H_2S$;
hydrogen chloride—HCl The methylsilicic acid hydrogels produced according to the examples set forth below, were subjected to a complex of studies and unexpectedly had the properties of supramolecular compounds.

Analysis of the obtained data led to the conclusion that the premises for obtaining supramolecular structures are:

presence of the OH groups protecting component in the system, and the protective effect is provided by the formed solution of sodium carbonate (in case of synthesis using carbon dioxide); sodium sulfite (in case of synthesis using sulfur dioxide (IV); sodium sulfide (in case of synthesis using hydrogen sulfide);

presence of gas-liquid phase transition. In this case, due to the presence of the gas phase, the cyclization and trimerization of the molecule is easier, unlike the same process in the liquid phase (the viscosity is counteracted by the liquid, which is by an order greater than that of the gases).

Due to the use of gaseous weak acids and weak acid anhydrides in the gaseous state in the synthesis of hydrogels, both premises are satisfied, making it possible to obtain samples with pronounced supramolecular properties. In using sulfur oxide (VI) and hydrogen chloride, only the second premise is satisfied, and the supramolecularity of the samples is less pronounced.

EXAMPLES OF PRODUCING A METHYLSILICIC ACID HYDROGEL WITH SUPRAMOLECULAR PROPERTIES

Example 1. Producing a Methylsilicic Acid Hydrogel with Supramolecular Properties 200 ml of solution of sodium methyl siliconate ($C_{NaOH}$=3.2M; $w_{(PMS)}$=180 g/l) was reacted with a carbon dioxide with a total volume of 15 liters. Bubbling time was 45 minutes. The bubbling rate was 333 ml $CO_2$/min. The applied feeding method was feeding through the bottom valve of the reactor. The process was carried out in a closed system. The resulting product was floated in the neck of the reactor. After completion of the process, the product was removed from the reactor, vacuumised to remove residual gas and washed with water, purified to pH 6.5-7.0 and the absence of residual amounts of anions. Yield was 219 g (67% polymethylsiloxane in sodium methyl siliconate).

Hereinafter, the sample code for the example—MSAHG $CO_2$ 1

Example 2. The ratio of the feedstock was the same as in Example 1. The feeding method was feeding through the top valve of the reactor. The process was carried out in an open system. The resulting product was floated in the neck of the reactor. Further steps were the same as in Example 1. Yield was 232 g (71% of polymethylsiloxane in sodium methyl siliconate).

Hereinafter, the sample code for the example—MSAHG $CO_2$ 2

Example 3. A 20-liter cube-shaped container was filled with carbon dioxide for ¾ of the volume. In the container, there was previously placed an elastic fluoroplastic chute with sides closed in a ring, equipped with transverse troughs arranged at an angle of 45° in the horizontal plane to the main chute. The design was put on two shafts forming an endless conveyor belt. One of the shafts was connected through a gear to an electric motor. The angle of inclination to the container was 15-30°. The linear velocity of movement along the chute bottom upward ranged from 30 to 60 cm/min. The solution of methyl siliconate was fed dropwise through a comb with six nozzles. The total volume of sodium methyl siliconate was 200 ml. The process took 20 minutes. Sliding of the droplets along the hydrophobic surface of the chute in a $CO_2$ atmosphere under the action of gravity resulted in mixing of the droplet and its further solidification. Due to the counter-action of the linear velocity of the chute, the process was carried out under conditions as close as possible to the free fall of a drop in a $CO_2$ atmosphere. Further steps were the same as in Example 1. Yield was 238 g (73% of polymethylsiloxane in sodium methyl siliconate).

Hereinafter, the sample code for the example—MSAHG $CO_2$ 3

Examples 4-6. The equipment used and the process applied were the same as described in Examples 1-3, except that sulfur oxide (IV)—$SO_2$ was used as a gas.

The product yield was 228 g (71%); 222 g (68%); 231 g (70%), respectively.

Hereinafter, the sample codes for the examples—MSAHG $SO_2$ 4, MSAHG $SO_2$ 5, MSAHG $SO_2$ 6, respectively.

Examples 7-9. The equipment used and the process applied were the same as described in Examples 1-3, except that hydrogen sulfide—$H_2S$ was used as a gas.

The product yield was 230 g (67%); 228 g (70%); 220 g (66%), respectively.

Hereinafter, the sample codes for the examples—MSAHG $H_2S$ 7, MSAHG $H_2S$ 8, MSAHG $H_2S$ 9, respectively.

Examples 10-12. The equipment used and the process applied were the same as described in Examples 1-3, except that sulfur oxide (VI)—$SO_3$ was used as a gas.

The product yield was 242 g (69%); 230 g (68%); 245 g (71%), respectively.

Hereinafter, the sample codes for the examples—MSAHG $SO_3$ 10, MSAHG $SO_3$ 11, MSAHG $SO_3$ 12, respectively.

Examples 13-15. The equipment used and the process applied were the same as described in Examples 1-3, except that gaseous hydrogen chloride—HCl was used as a gas.

The product yield was 234 g (72%); 236 g (72%); 237 g (68%), respectively.

Hereinafter, the sample codes for the examples—MSAHG HGCl 13, MSAHG HCl 14, MSAHG HCl 15, respectively.

Experimental Part

Methylsilicic acid hydrogel produced using the known methods [UA No. 82774, C08G 77/00, 20081 (sample code MSAHG 0) and produced according to the method in Examples 1-15 were subject to study for:

adsorption activity;
type of structure;
presence of host-guest-type properties inherent in supramolecular structures.

The adsorption activity of the samples was studied using the methodology described in [Pharmaceutical Regulatory Documents on Analytical Method Validation, Registration Certificate No. UA/2341/01/01 "Methylsilicic acid hydrogel, gel (substance) for the production of non-sterile dosage forms". Applicant closed joint-stock company "Ekoloohoronna firma" KREOMA-PHARM", Kiev, 2004, 10 p].

Aqueous solutions of indicators of methyl orange (MO), Congo red (CR), Bengal pink (BP), and protein—bovine serum albumin V (BSA) were used as adsorbate. For solution of BSA, UV-VIS spectrophotometry was performed for the biuret complex after treatment of an aliquot of the protein solution with a biuret reagent. When applying the above methodology for controlling the adsorption activity with respect to the samples obtained from Examples 1-9, the indicators reached high values. Given that manufacturers validate the reliability of the data beyond the nominal value of not more than 140% [State Pharmacopoeia of Ukraine/State Enterprise "Scientific and Expert Center Pharmacopoeia Center"0.1st ed. Supplement 2. Kharkov: State Enterprise "Scientific and Expert Center Pharmacopoeia Center", 2008, 620 p], the working ability of the methodology with reliable values was 4.50 µmol/h. In case of inflating data, the authors of the patent applied values of adsorption activity in units of gmol/g in the form of "more than 4.50 µmol/g". In parallel, the values of the adsorption activity were calculated in units of mg/g. The obtained data of adsorption activity vales are given in Table 3.

The types of structure of the samples were studied using IR spectrometry and a mixed water detection method.

For IR spectrometry, test portions of samples were preliminary placed in paraffin oil and dispersed to form a homogenous suspension. The resulting mixture was placed in a heating cabinet, heated to 150° C. and kept at this temperature for 1:00 to completely remove water from the hydrogel. After cooling the mixture was redispersed. For all the samples prepared, the IR spectrum was recorded on an IRAffinity-IS FT-IR spectrometer. In parallel, the IR spectrum of pure paraffin oil was recorded to further subtract it from the main spectrum.

The above technique of preparing samples makes it possible to study the direct structure of the test sample with minimal losses of primary characteristics that are lost during normal heating of the samples due to polycondensation of OH groups during heating.

The obtained IR spectra were processed using Fourier transformation of spectra with emphasis on the range of wave numbers in the ranges of 1200-1000 cm$^{-1}$ (Si—O—Si— bond) and 800-650 cm$^{-1}$ (Skeletal vibrations of the molecule). In cases of presence of an overwhelming number of T-fragments in the molecules, both increase in the intensity of absorption lines in the range of 800-650 cm$^{-1}$ and a shift in the position of the line within the range were observed. To establish dependence of intensity on the concentration of T-fragments, the samples were further treated with solutions of hydrochloric acid of different concentration, provoking polycondensation of the hydrogel and formation of T-fragments according to the schemes shown in Table 2. Value of intensity for completely dehydrated samples was used as the reference point of the intensity value on the IR spectrum (formula $M_0D_0T_1$).

To calculate the content of OH groups in the molecules, a mixed water determination method was used: thermogravimetry and titration of water according to K. Fisher method. The thermogravimetric method for water determination was used based on the conventional techniques of this control. The results of determining the total amount of water were the starting points for further calculation of composition of the samples.

Water titration according to K. Fisher method was carried out on prepared samples. Sample preparation consisted of preliminary mixing a methylsilicic acid hydrogel with different amounts of methyl alcohol with known water content. Mixing was carried out using the weight method. Due to the fact that when mixed with hydrogel, methyl alcohol initially dissolves in the water of the hydration shell and partially provokes solvate substitution and polycondensation of OH groups, the use of different ratios of methyl alcohol and hydrogel in extrapolation to zero methyl alcohol content makes it possible to calculate the content of OH groups in the sample. The final value of the content of OH groups in the samples was calculated by subtracting the mass of water obtained by extrapolation to the zero content of methyl alcohol during titration of water according to K. Fisher method, from the mass of water obtained by the thermogravimetric method, followed by multiplying the result by two. The calculation results are shown in Table 3.

In the course of the study, hydrogels produced by using the known methods [UA No. 82774] are mainly described by formulas with ranges of coefficients:

$$0.05 \leq \frac{a}{n} \leq 0.24; \ 0.07 \leq \frac{b}{n} \leq 0.18; \ 0.63 \leq \frac{c}{n} \leq 0.85,$$

have a ratio of D- and T- fragments from 0.06 to 0.11 and a content of OH groups from 12 to 26%. Hydrogels produced by the method are described by formulas with ranges of coefficients:

$$0 \leq \frac{a}{n} \leq 0.38; \ 0.19 \leq \frac{b}{n} \leq 0.9; \ 0.11 \leq \frac{c}{n} \leq 0.49,$$

have a ratio of D- and T-fragments from 0.10 to 0.15 and the content of OH groups from 20 to 24%.

Based on the studies conducted, the generalized chemical formula of methylsilicic acid hydrogels obtained in Examples 1-15 has the form:

$$[\{CH_3Si(OH)_2O_{0.5}\}_{a/n}\{CH_3Si(OH)O\}_{b/n}\{CH_3SiO_{1.5}\}_{c/n}] \cdot xH_2O$$

or in reduced form:

$$M_{a/n}D_{b/n}T_{c/n} \cdot xH_2O,$$

where $$11 \leq x \leq 35;$$
$$0 \leq \frac{a}{n} \leq 0.38;$$
$$0.19 \leq \frac{b}{n} \leq 0.9;$$
$$0.11 \leq \frac{c}{n} \leq 0.49$$

TABLE 3

Basic properties of studied compounds and chemical formulas thereof

| Example | Code of sample | \multicolumn{4}{c}{Name of adsorbate} | | | | Dry residue, % | OH group content, % | Formula of compound |
|---|---|---|---|---|---|---|---|---|---|---|---|
| | | MO | CR | BP | BSA | MO 327.3 | CR 696.7 | BP 1017.7 | BSA 69000 | | | |
| | | \multicolumn{4}{c}{Adsorption activity, μmol/g} | \multicolumn{4}{c}{Adsorption activity, mg/g} | | | |
| | MSAHG 0 | 3.94 | 3.42 | 2.13 | 0.072 | 1.290 | 2.383 | 2.1168 | 4.968 | 9.63 | 20.29 | $M_{0.15}D_{0.17}T_{0.68} \cdot 23H_2O$ |
| 1 | MSAHG CO$_2$ 1 | 4.50 * | 4.50 * | 4.50 * | 0.219 | 3.928 | 7.872 | 9.077 | 15.111 | 11.39 | 23.96 | $M_{0.1}D_{0.78}T_{0.12} \cdot 20H_2O$ |
| 2 | MSAHG CO$_2$ 2 | 4.50 * | 4.50 * | 4.50 * | 0.223 | 4.026 | 8.360 | 9.332 | 15.387 | 10.52 | 22.16 | $M_{0.15}D_{0.7}T_{0.15} \cdot 22H_2O$ |
| 3 | MSAHG CO$_2$ 3 | 4.50 * | 4.50 * | 4.50 * | 0.237 | 4.583 | 9.056 | 9.423 | 16.353 | 8.93 | 20.12 | $M_{0.22}D_{0.4}T_{0.38} \cdot 24H_2O$ |

TABLE 3-continued

Basic properties of studied compounds and chemical formulas thereof

| | | Name of adsorbate | | | | Name of adsorbate | | | | Dry residue, % | OH group content, % | Formula of compound |
|---|---|---|---|---|---|---|---|---|---|---|---|---|
| | | | | | | MO | CR | BP | BSA | | | |
| | | | | | | \multicolumn{4}{c}{Molecular mass of adsorbate} | | | |
| | | MO | CR | BP | BSA | 327.3 | 696.7 | 1017.7 | 69000 | | | |
| Example | Code of sample | \multicolumn{4}{c}{Adsorption activity, μmol/g} | | \multicolumn{4}{c}{Adsorption activity, mg/g} | | | | |
| 4 | MSAHG SO$_2$ 4 | 4.50 * | 4.50 * | 4.50 * | 0.205 | 3.437 | 7.663 | 8.904 | 14.145 | 9.84 | 22.18 | $M_{0.3}D_{0.25}T_{0.45}\cdot 24H_2O$ |
| 5 | MSAHG SO$_2$ 5 | 4.50 * | 4.50 * | 4.50 * | 0.200 | 3.512 | 8.360 | 9.159 | 13.800 | 9.92 | 20.90 | $M_{0.1}D_{0.75}T_{0.15}\cdot 22H_2O$ |
| 6 | MSAHG SO$_2$ 6 | 4.50 * | 4.50 * | 4.50 * | 0.196 | 3.862 | 7.663 | 9.088 | 13.524 | 7.84 | 17.67 | $M_{0.2}D_{0.5}T_{0.3}\cdot 31H_2O$ |
| 7 | MSAHG H$_2$S 7 | 4.50 * | 4.50 * | 4.50 * | 0.203 | 3.142 | 6.479 | 8.864 | 14.007 | 11.02 | 22.96 | $M_{0.16}D_{0.65}T_{0.2}\cdot 20H_2O$ |
| 8 | MSAHG H$_2$S 8 | 4.50 * | 4.50 * | 4.50 * | 0.195 | 3.273 | 7.106 | 8.843 | 13.455 | 10.81 | 22.75 | $M_{0.25}D_{0.45}T_{0.3}\cdot 22H_2O$ |
| 9 | MSAHG H$_2$S 9 | 4.50 * | 4.50 * | 4.50 * | 0.207 | 3.437 | 7.454 | 8.884 | 14.283 | 10.83 | 23.61 | $M_{0.37}D_{0.25}T_{0.37}\cdot 21H_2O$ |
| 10 | MSAHG SO$_3$ 10 | 4.50 * | 4.50 * | 4.50 * | 0.130 | 1.571 | 3.205 | 4.661 | 8.970 | 11.27 | 23.74 | $M_{0.25}D_{0.5}T_{0.25}\cdot 20H_2O$ |
| 11 | MSAHG SO$_3$ 11 | 4.50 * | 4.50 * | 4.50 * | 0.140 | 1.555 | 3.225 | 4.640 | 9.660 | 11.03 | 23.24 | $M_{0.22}D_{0.55}T_{0.23}\cdot 20H_2O$ |
| 12 | MSAHG SO$_3$ 12 | 4.50 * | 4.50 * | 4.50 * | 0.130 | 1.578 | 3.219 | 4.600 | 8.970 | 11.36 | 23.93 | $M_{0.16}D_{0.7}T_{0.14}\cdot 21H_2O$ |
| 13 | MSAHG HCl 13 | 4.50 * | 4.50 * | 4.50 * | 0.170 | 1.584 | 3.344 | 4.834 | 11.730 | 10.84 | 23.62 | $M_{0.13}D_{0.75}T_{0.12}\cdot 21H_2O$ |
| 14 | MSAHG HCl 14 | 4.50 * | 4.50 * | 4.50 * | 0.180 | 1.604 | 3.358 | 4.813 | 12.420 | 11.07 | 23.32 | $M_{0.17}D_{0.64}T_{0.19}\cdot 19H_2O$ |
| 15 | MSAHG HCl 15 | 4.50 * | 4.50 * | 4.50 * | 0.170 | 1.548 | 3.274 | 4.864 | 11.730 | 11.12 | 23.43 | $M_{0.3}D_{0.4}T_{0.3}\cdot 20H_2O$ |

* Calculated value lies beyond the upper limit of the validated control methodology The study of supramolecular properties was carried out guided by the following principles:

1. Selection of conditions for changing the conformation of hydrogel molecules. In other words, the selection of the "key" for locking/unlocking the "guest" and the "host" [Supramolecular Chemistry. Translated from English: in 2 vol./Jonathan W. Steed, Jerry L. Atwood.—M.; IKC "Akademkniga", 2007].

2. Checking the strength of the formed complex. In other words—"resistance to breaking";

3. Recognition of a specific "guest" as a property of selectivity.

To test the behavior of host-guest hydrogels, the UV-VIS absorption spectra were previously recorded for equivalent solutions of the indicated substances (MO, CR, BP, BSA) at a pH in the range from 1.0 to 9.0, and vice versa—from 9.0 to 1.0 for adsorbate solutions other than BSA, and at a pH in the range from 3.0 to 8.0 and vice versa—rom 9.0 to 1.0 for BSA solutions. The temperature range of the solutions was varied from 40° to 60° C. for BSA solutions and in the range from 40° to 80° C. for solutions of other adsorbates.

The study of the properties of host-guest hydrogels was carried out by first adding hydrochloric acid in an amount sufficient to achieve a pH of 1.0 by the solution to the system containing the hydrogel and the adsorbate solution.

Further study of the properties was carried out:
when changing the pH of the medium by adding solutions of sodium hydroxide;
when diluting the adsorbate solution by decantation with purified water;
when heated and aged at increased temperatures.

To compare the adsorption activity of samples of various hydrogels, the previously measured adsorption activity in units of mg/g normalizing in the scale range from 0 to 1 (0-100%).

Figure 2:
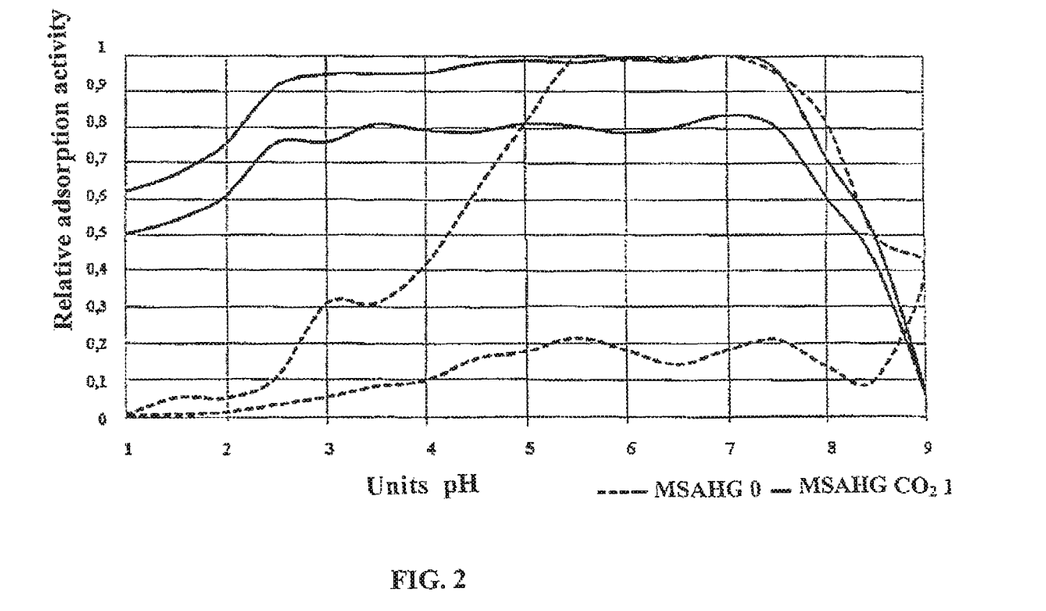

The change in the relative adsorption activity of hydrogels depending on the pH of the medium is presented in FIG. 2.

As can be seen from FIG. 2, the samples of hydrogels produced by the claimed method have a supramolecular, partially renewable property of host-guest type. In the present case, locking of the guest occurs at fairly low pH values and continues for pH values up to 8.5 units. Also unexpected was the ability of the samples to reappear similar effects. Given the fact that the pH value is quite close to the pH of the human stomach and intestines, manifestations of discovered properties will be useful from a medical point of view.

Studies with dilution of the stock solutions of adsorbates by decantation with purified water and change in temperature were carried out to exclude possible manifestation of only adsorption component properties by the samples.

Samples of hydrogels produced by the claimed method demonstrated the typical behavior of supramolecular structures of the host-guest type as a preorganized conformationally mobile host.

Decantation with purified water was carried out with measurement of the optical density of the solution and calculation of the adsorbate concentration. The hydrogels produced according to the method of the claimed invention, as decanting with a purified water was carried out, partially desorbed the adsorbate in the range of 20-30% (MO, CR, BP) and 35-50% (BSA) and behaved like the graph in FIG. 2 as the pH of the solution changed.

Heating of solutions and aging at temperatures in the range from 40 to 60 (80)° C. do not cause obvious changes of values.

The invention claimed is:

1. A method of producing a methylsilisic acid hydrogel with properties of supramolecular structures, the method using a solution of sodium methyl siliconate, wherein a gaseous acid agent is passed through the solution of sodium methyl siliconate fed in a reactor, for bubbling, the resulting product is floated in a neck of the reactor, after the end of the process the product is discharged from the reactor, vacuumised to remove residual gas, and washed with water purified to pH 6.5-7.0 without residual amounts of anions, obtaining the methylsilisic acid hydrogel with properties of supramolecular structures, which is described by the formula:

[{CH$_3$Si(OH)O$_{0.5}$}$_{a/n}${CH$_3$Si(OH)O)}$_{b/n}${CH$_3$SiO$_{1.5}$}$_{c/n}$]·xH$_2$O, where $$11 \leq x \leq 35; 0 \leq \frac{a}{n} \leq 0.38; 0.19 \leq \frac{b}{n} \leq 0.9; 0.11 \leq \frac{c}{n} \leq 0.49.$$

2. The method according to claim 1, wherein the bubbling time is 45 minutes, the bubbling rate is 333 ml of the gaseous agent per minute.

3. The method according to claim 1, wherein the gaseous acid agent is carbon dioxide which s fed through the bottom valve of the reactor by operating in a closed system.

4. The method according to claim 1, wherein the gaseous acid agent is carbon dioxide which is fed through the top valve of the reactor by operating in an open system.

5. The method according to claim 1, wherein the gaseous acid agent is sulfur oxide (IV)—$SO_2$.

6. The method according to claim 1, wherein the gaseous acid agent is hydrogen sulfide—$H_2S$.

7. The method according to claim 1, wherein the gaseous acid agent is sulfur oxide (VI)—$SO_3$.

8. The method according to claim 1, wherein the gaseous acid agent is hydrogen chloride—HCl.

9. The method according to claim 1, wherein the sodium methyl siliconate is added dropwise through a comb over the hydrophobic surface of the trough placed in the gaseous acid agent medium for 20 minutes.

10. A methylsilisic acid hydrogel with properties of supramolecular structures, which is described by the formula:

$$[\{CH_3Si(OH)_2O_{0.5}\}_{a/n}\{CH_3Si(OH)O\}_{b/n}\{CH_3SiO_{1.5}\}_{c/n}] \cdot xH_2O, \text{ where}$$

$$11 \leq x \leq 35;\ 0 \leq \frac{a}{n} \leq 0.38;\ 0.19 \leq \frac{b}{n} \leq 0.9;\ 0.11 \leq \frac{c}{n} \leq 0.49.$$

wherein the said hydrogel is produced according to the method of claim 1.

* * * * *

UNITED STATES PATENT AND TRADEMARK OFFICE
CERTIFICATE OF CORRECTION

PATENT NO. : 11,104,694 B2
APPLICATION NO. : 16/642963
DATED : August 31, 2021
INVENTOR(S) : Oleksandr Mykhailovych Martynenko et al.

Page 1 of 1

It is certified that error appears in the above-identified patent and that said Letters Patent is hereby corrected as shown below:

In the Claims

Claim 1, Column 16, Lines 60-61:
"[{CH$_3$Si(OH)O$_{0.5}$}$_{a/n}${CH$_3$Si(OH)O)}$_{b/n}${CH$_3$SiO$_{1.5}$}$_{c/n}$].xH$_2$O"
Should read as:
--[{CH$_3$Si(OH)$_2$O$_{0.5}$}$_{a/n}${CH$_3$Si(OH)O}$_{b/n}${CH$_3$SiO$_{1.5}$}$_{c/n}$] · xH$_2$O--.

Claim 10, Column 18, Lines 7-8:
"[{CH$_3$Si(OH)$_2$O$_{0.5}$}$_{a/n}${CH$_3$Si(OH)O)}$_{b/n}${CH$_3$SiO$_{1.5}$}$_{c/n}$].xH$_2$O"
Should read as:
--[{CH$_3$Si(OH)$_2$O$_{0.5}$}$_{a/n}${CH$_3$Si(OH)O}$_{b/n}${CH$_3$SiO$_{1.5}$}$_{c/n}$] · xH$_2$O--.

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*